UNITED STATES PATENT OFFICE.

JAMES FOLEY, OF MONTREAL, QUEBEC, CANADA.

IMPROVEMENT IN TANNING-SOLUTIONS.

Specification forming part of Letters Patent No. 193,443, dated July 24, 1877; application filed September 28, 1876.

*To all whom it may concern:*

Be it known that I, JAMES FOLEY, of Montreal, in the Province of Quebec and Dominion of Canada, have invented certain new and useful Improvements in Preparing and Preserving Tanning-Solutions; and I do hereby declare that the following is a full, clear, and exact description thereof, which will enable others skilled in the art to which it pertains to make and use the same.

Tanning-solutions as at present prepared, by saturating bark and other astringent substances with either hot or cold water, do not extract the whole of the tannic acid. Fully an eighth of the tannin or tanning principle remains in the bark, and is lost. Apart from this a large percentage of extractive and coloring matter is extracted, which is found to be injurious both to the tannic acid and leather. When these solutions are exposed to the air they sour, and the tannic acid therein is converted into gallic acid, which is useless as a tanning agent, being incapable of combining with gelatinous tissue, thereby causing loss to the tanners.

Through a series of experiments I have found that by impregnating the water intended for use in leaching bark, and preparing tanning-solutions from other astringent substances with bisulphite of lime, the whole of the tannic acid known to exist in the bark is obtained—fully twenty per cent. more than can be got by the use of water alone, and the solutions prepared through the agency of bisulphite of lime do not ferment or sour, nor will the tannic acid therein become converted into gallic acid upon exposure to the air at any temperature.

Although I have found bisulphite of lime the most suitable and convenient in practice, the following, or their equivalents, may be used to obtain the desired result: Liquid sulphurous acid, sulphite of soda, or sulphite of lime, separately or combined; but for economy and quick action I prefer the use of bisulphite of lime alone.

The manner in which my said invention is operated is as follows: In preparing strong tanning-solutions, I incorporate with or add to water, previous to its being used over bark for leaching, or over other astringent substances in the preparation of tanning-solutions, about half a pint of bisulphite of lime to each gallon of water intended for use; if liquid sulphurous acid is used, one pint to each gallon of water; if sulphite of soda, or equivalent salts, are used, about one ounce to each gallon of water. The proportions of these chemicals must be regulated according to the nature of the bark or substances to be treated, and the strength of the solution required. The last drawing from the leach, being a weak solution, is generally used to run over fresh bark, and so, also, are the exhausted tanning-liquors. Both of these are impregnated with the chemicals used, but not sufficiently so to serve over a large body of fresh-ground bark; therefore, I add to these weak solutions, before being run over fresh bark, about one-half the quantity of the chemicals above named, to replace what may have been absorbed by the bark and hides.

By the application of these chemicals tanning-solutions may be prepared from all tanning substances freed from the objectionable extractive coloring matter, and preserved from decomposition, to tan hides and skins in one-half the time occupied by solutions as at present prepared, producing lighter-colored and heavier leather, and improving its keeping qualities.

What I claim as my invention, and desire to secure by Letters Patent, is—

The process of preparing the tannin-extract, which consists in leaching the ground bark with water having bisulphite of lime in solution, substantially as and for the purposes set forth.

In testimony that I claim the foregoing as my own, I affix my signature in presence of two witnesses.

JAMES FOLEY.

Witnesses:
C. DE SALAHERRY,
JOHN M. CAMPBELL.